(12) United States Patent
Kataumi et al.

(10) Patent No.: US 6,378,395 B1
(45) Date of Patent: Apr. 30, 2002

(54) COLUMN SHIFT DEVICE WITH KEY INTERLOCK MECHANISM

(75) Inventors: Yoshimasa Kataumi, Saitama; Ryoichi Fujiwara, Shizuoka, both of (JP)

(73) Assignee: Fuji Kiko Co., Ltd., Kosai (JP)

( * ) Notice: Subject to any disclaimer, the term of this patent is extended or adjusted under 35 U.S.C. 154(b) by 0 days.

(21) Appl. No.: 09/679,607

(22) Filed: Oct. 5, 2000

(30) Foreign Application Priority Data

Oct. 19, 1999 (JP) .......................................... 11-296144

(51) Int. Cl.[7] .............................................. B60K 20/00
(52) U.S. Cl. ............................... 74/473.31; 192/220.2; 477/96; 477/99; 70/245
(58) Field of Search ........................... 74/473.31, 473.3, 74/473.1, 473.21, 473.23, 473.24, 473.25, 473.26, 473.28; 70/245; 477/96, 99; 192/220.2, 220.4

(56) References Cited

U.S. PATENT DOCUMENTS

| | | | |
|---|---|---|---|
| 5,050,411 A | * | 9/1991 | Kawachi et al. ............... 70/248 |
| 5,299,470 A | * | 4/1994 | Snell et al. ..................... 477/99 |
| 5,647,465 A | * | 7/1997 | Burkhard et al. ......... 192/220.4 |
| 5,882,275 A | * | 3/1999 | Tazai ............................. 477/99 |
| 5,896,777 A | | 4/1999 | Tazai ........................... 74/473.1 |

FOREIGN PATENT DOCUMENTS

JP         10-53041         2/1998

* cited by examiner

Primary Examiner—Thomas R. Hannon
Assistant Examiner—Justin Stefanon
(74) Attorney, Agent, or Firm—Foley & Lardner

(57) ABSTRACT

A column shift device includes a steering column, a bracket secured to the steering column, a shift lever rotatably supported to the steering column through the bracket, a position plate mounted to the shift lever and including a detent portion, a detent plate swingably supported by the bracket for engaging and disengaging from the detent portion of the position plate, a wire arranged through the shift lever and having one end connected to the detent plate and another end connected to a select button of the shift lever, a cam arranged with the shift lever for unitary rotation and including a cam portion, a key cylinder arranged with the bracket, a support lever rotatably supported by the bracket and having one end biased to engage with the cam portion of the cam and another end which can abut on the detent plate, a key lock lever arranged rotatable with the support lever, and a lock pin connected to the key lock lever for engaging and disengaging from the key cylinder.

11 Claims, 4 Drawing Sheets

COLUMN SHIFT DEVICE WITH KEY INTERLOCK MECHANISM

BACKGROUND OF THE INVENTION

The present invention relates to column shift devices for motor vehicles.

A column shift device is a shift device mounted to a steering column for motor vehicles and having a shift lever disposed in the vicinity of a steering wheel to be rotatable, when pushing a select button, for selection of a desired shift range or position.

The steering column is arranged with a key interlock mechanism which is a mechanism for preventing removal of a key from a key cylinder during cruising of a vehicle and allowing it only at parking (P) range. Though operated with the column shift device for that purpose, the key interlock mechanism is a component fully different from the column shift device, and is thus mounted to the steering column separately. And a lock pin of the key cylinder and a key interlock lever of the column shift device are connected to each other through a cable.

In the configuration wherein the key interlock mechanism is formed with a cable, however, a wide space is needed to dispose the cable, raising a problem of an increase in size, number of parts and weight. Particularly, an increase in number of parts can produce greater dispersion of the dimension of a key interlock portion due to their tolerances of the parts, resulting in a problem of time-consuming adjustment.

SUMMARY OF THE INVENTION

It is, therefore, an object of the present invention to provide a shift column device which can overcome the above problems with a simple configuration.

Generally, the present invention provides a column shift device, comprising:
- a steering column;
- a bracket secured to said steering column;
- a shift lever rotatably supported to said steering column through said bracket;
- a position plate mounted to said shift lever, said position plate including a detent portion;
- a detent plate swingably supported by said bracket, said detent plate engaging and disengaging from said detent portion of said position plate;
- a wire arranged through said shift lever, said wire having one end connected to said detent plate and another end connected to a select button of said shift lever;
- a cam arranged with said shift lever for unitary rotation, said cam including a cam portion;
- a key cylinder arranged with said bracket;
- a support lever rotatably supported by said bracket, said support lever having one end biased to engage with said cam portion of said cam and another end which can abut on said detent plate;
- a key lock lever arranged rotatable with said support lever; and
- a lock pin connected to said key lock lever, said lock pin engaging and disengaging from said key cylinder.

One aspect of the present invention lies in providing a column shift device, comprising:
- a steering column;
- a bracket secured to said steering column;
- a shift lever rotatably supported to said steering column through said bracket;
- a position plate mounted to said shift lever, said position plate including a detent portion;
- a detent plate swingably supported by said bracket, said detent plate engaging and disengaging from said detent portion of said position plate;
- a wire arranged through said shift lever, said wire having one end connected to said detent plate and another end connected to a select button of said shift lever;
- a cam arranged with said shift lever for unitary rotation, said cam including a cam portion;
- a key cylinder arranged with said bracket;
- a support lever rotatably supported by said bracket, said support lever having one end biased to engage with said cam portion of said cam and another end which can abut on said detent plate;
- a key lock lever arranged rotatable with said support lever;
- a lock pin connected to said key lock lever, said lock pin engaging and disengaging from said key cylinder;
- a protrusion formed on said cam;
- a switch arranged with said bracket, said switch being operable by abutting on said protrusion when said shift lever is shifted to a parking range; and
- a shift lock mechanism arranged responsive to said switch, said shift lock mechanism being capable of preventing movement of said detent plate.

DETAILED DESCRIPTION OF THE INVENTION

Figure 1:
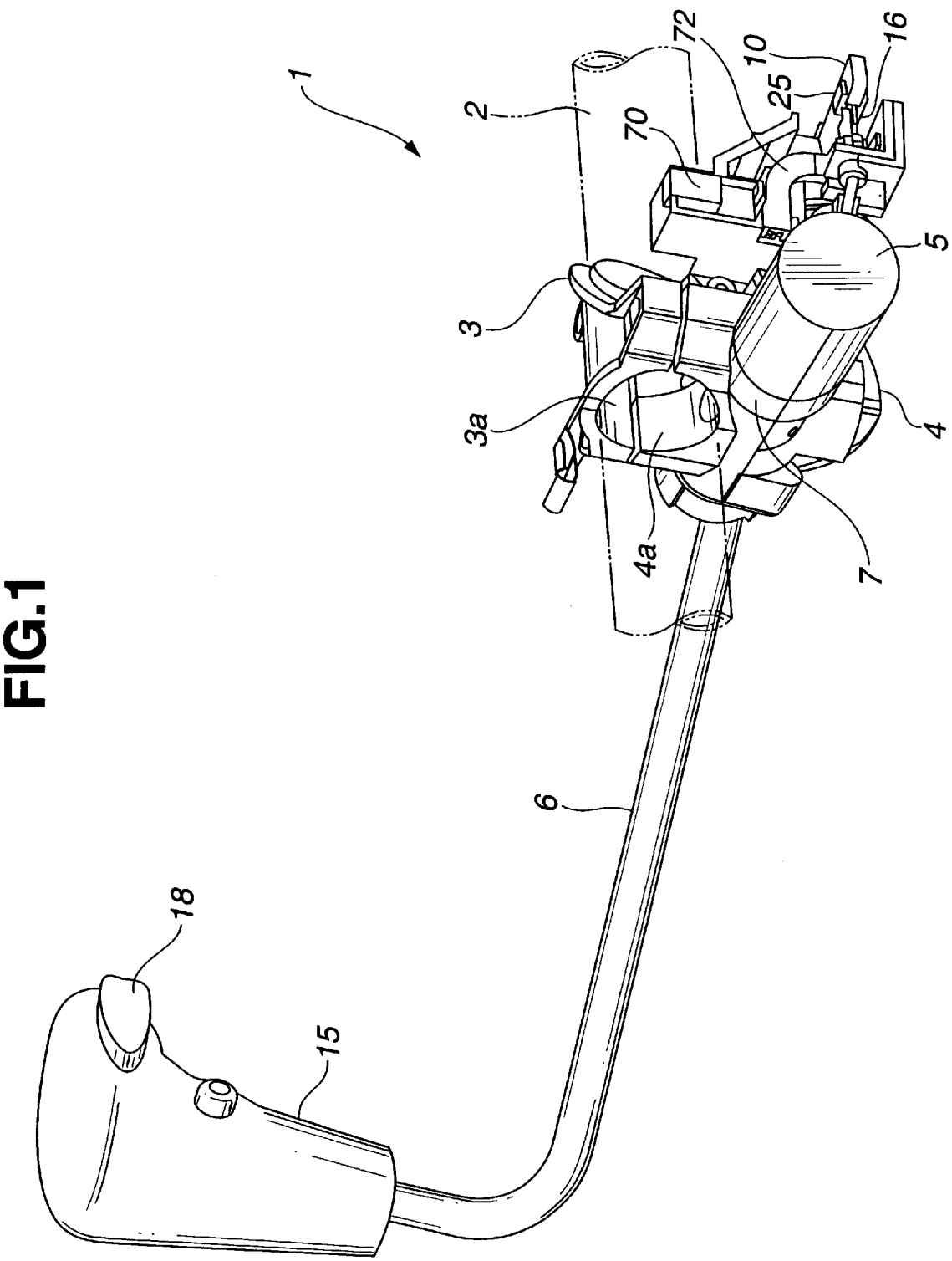
FIG. 1 is a perspective view showing a column shift device for a motor vehicle embodying the present invention.

Referring to the drawings, a description will be made with regard to a column shift device with a key interlock mechanism embodying the present invention.

Figure 2:
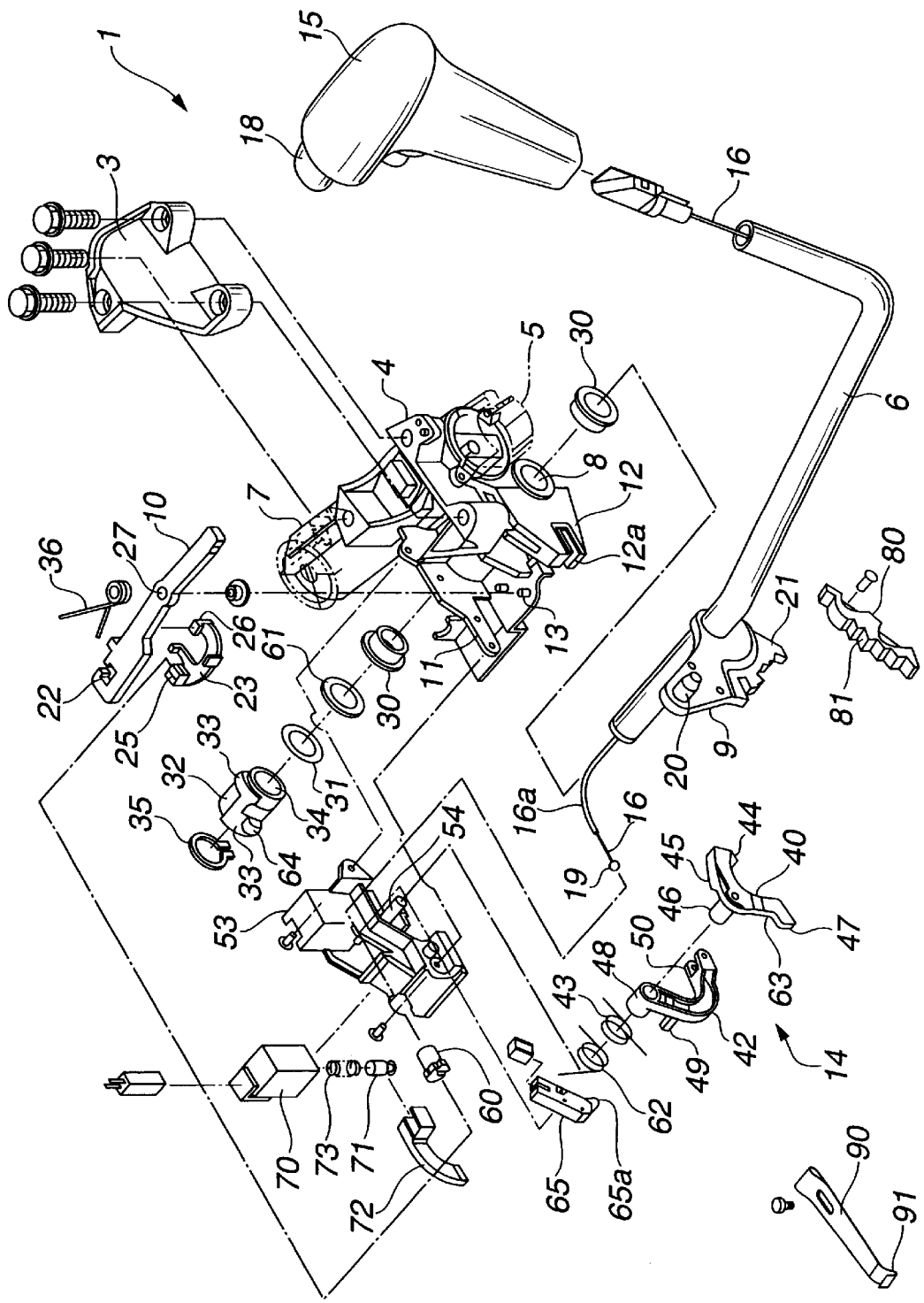
FIG. 2 is an exploded perspective view showing the column shift device.

Referring to FIGS. 1–2, a column shift device 1 with a key interlock mechanism comprises a jacket tube 2 and upper and lower bracket 3, 4 having respective curved portions 3a, 4a for holding the jacket tube 2, and is mounted to a steering column, not shown, through the brackets 3, 4. The lower bracket 4 constitutes a base, with which a key interlock mechanism is integrally formed. Specifically, a key cylinder 5 is arranged crosswise with the lower bracket 4, and a shift lever 6 is rotatably supported thereto. The key cylinder 5 is a different and separate component of a predetermined standard, so that a cylindrical-shaped key cylinder frame 7 for receiving the key cylinder 5 is integrated or mounted to the lower bracket 4, and the key cylinder 5 is arranged through the key cylinder frame 7 for fixing through an appropriate means.

The upper and lower brackets 3, 4 comprise a molding such as a die casting, and are integrated with the jacket tube 2 interposed therebetween by fastening bolts. As shown in FIG. 2, the lower bracket 4 is formed with a sleeve 8 for receiving a base of the shift lever 6, and guide or support portions 11, 12 for guiding and supporting a detent plate 10 which engages or disengages from a position plate 9 perpendicularly fixed to the base of the shift lever 6. A unit base 53 having a key interlock mechanism 14 assembled is secured to the guide portion 11, and a groove 12a is formed with the support portion 12, with which the detent plate 10 engages. A shaft pin 13 protrudes from a guide face located between the support portions 11, 12 to rotatably support the detent plate 10.

The shift lever 6 includes a pipe having one end with a knob 15 and another end with the position plate 9 mounted in the vicinity thereof, and a wire 16 passing through the inside of the pipe. The wire 16 has one end connected to a slide member which is in slide contact with a select button 18 within the knob 15, and another end including a ball end 19 which engages with the detent plate 10. The position plate 9 has a roughly fan-shaped end with a pin 20 protruding therefrom, to which a control cable for an automatic transmission is connected. The position plate 9 includes a stepped detent portion 21, from which one end of the detent plate 10 engages or disengages. The detent portion 21 is configured to correspond to shift ranges such as parking (P), rear (R), neutral (N), drive (D) and top (T) ranges.

The one end of the detent plate 10 is shaped flat to engage or disengage from the detent portion 21, and another end is integrally formed with an engagement 22 for receiving the ball end 19, to which an adapter 23 is mounted for securing the ball end 19. The adapter 23 is made of a synthetic resin, and has one end with an enclosure 25 for catching the ball end 19 and another end with a bend 26 for holding and fixing the side of the detent plate 10. The enclosure 25 can be received in the engagement 22 of the detent plate 10. A shaft hole 27 is formed substantially in the center of the detent plate 10.

Another end or position plate 9 side end of the shift lever 6, which is inserted into the sleeve 8 of the lower bracket 4 through bushes 30, a spring washer 61, a flat washer 31, etc., has a cam 32 attached thereto for unitary rotation and a C-shaped ring 35 for preventing its disengagement, ensuring rotatable mounting of the shift lever 6 to the lower bracket 4. The enclosure 25 of the adapter 23 having the ball end 19 received engages with the engagement 22 of the detent plate 10 to secure the adapter 23 to the detent plate 10. An end of a clad 16a of the wire 16 is secured, through a holder 60, to the unit base 53 fixed to the lower bracket 4.

The shaft hole 27 of the detent plate 10 engages with the shaft pin 13 of the lower bracket 4 so that the detent plate 10 is rotatable and has both ends guided by the guide portions 11, 12. Moreover, the detent plate 10 is biased by a spring 36 in the direction that the one end of the detent plate 10 engages with the detent portion 21, so that the ball end 19 always draws the wire 16 to the column shift device 1.

The key interlock mechanism 14 comprises a support lever 40 and a key lock lever 42, and is rotatably supported through a shaft pin 54 of the unit base 53. The support lever 40 is a curved lever having one end with a protrusion 44 which engages or disengages from a cam portion 33 of the cam 32, a roughly center portion with a shank 46 which receives the shaft pin 54, and another end with a contact 47 which abuts on the detent plate 10 through the bend 26 of the adapter 23. The key lock lever 42 is a curved lever having one end with a sleeve 48 and another end with a holder 50 for swingably supporting a lock pin 51 (see FIG. 3B, for example) which engages or disengages from the key cylinder 5.

A protrusion 45 is formed with the support lever 40 to engage with one end of a spring 62, another end of which engages with the unit base 53 to bias the support lever 40 in the direction that the protrusion 44 always abuts on the cam portion 33 of the cam 32. Moreover, a spring 43 is provided having one end which engages with the protrusion 45 of the support lever 40 and another end which engages with a protrusion 49 of the key lock lever 42 so as to bias the support lever 40 and the key lock lever 42 in the direction that a protrusion 44 side end of the support lever 40 and a holder 50 side end of the key lock lever 42 adjoin to each other. Since a protrusion 63, which is formed with the support lever 40 on the side of the contact 47, abuts on an end face of the key lock lever 42, the support lever 40 and the key lock lever 42 rotate together without further adjoining to each other.

The shank 46 of the support lever 40 is coaxially fit into the sleeve 48 of the key lock lever 42, and the sleeve 48 is in turn engaged with the shaft pin 54 of the unit base 53, which is biased by the spring 43 to allow unitary rotation. The unit base 53 is secured to the support portion 11 of the lower bracket 4, and the shift lever 6 is held by the support lever 40 and the key lock lever 42. Then, the protrusion 44 of the support lever 40 comes in contact with the cam portion 33 of the cam 32 by a biasing force of the spring 62.

The cam portion 33 of the cam 32 is configured such that a part is relatively low, which abuts on the protrusion 44 of the support lever 40 when the shift lever 6 is in P range, and other parts corresponding to the other ranges are relatively high. When the shift lever 6 is shifted to P range, the support lever 40 is rotated with the key lock lever 42 by a biasing force of the spring 62.

The cam 32 rotates with the shift lever 6, with a protrusion 34 of the inner face of a through hole engaging with a groove, not shown, of the shift lever 6. A protrusion 64 is integrally formed on the outer peripheral face of the cam 32. When the shift lever 6 is shifted to P range, the protrusion 64 of the cam 32 abuts on a detector part 65a of a switch 65 arranged with the unit base 53 so as to electrically detect P range, putting a shift lock mechanism in the operable state.

The shift lock mechanism comprises a solenoid 70 secured to the unit base 53, and a lock arm 72 arranged with a plunger 71 of the solenoid 70 to be capable of abutting on the detent plate 10. The plunger 71 of the solenoid 70 is biased by a spring 73 in the protruding direction so that the solenoid 70 has protruded plunger when the solenoid fails to be energized.

When the shift lever 6 is in any of the ranges other than P range, the head of the plunger 71 abuts on the cam portion 33 of the cam 32 to have no protrusion, and the lock arm 72 fails to abut on the detent plate 10. Thus, the select button can be operated to engage or disengage the detent plate 10 from the detent portion 21 of the position plate 9, obtaining shift operation. On the other hand, when the shift lever 6 is shifted to P range, the head of the plunger 71 is detached from the cam portion 33 to have protrusion, and the lock arm 72 is moved to the position where it can abut on the detent plate 10. Thus, shift lock is obtained wherein the detent plate 10 is prevented from disengaging from the detent portion 21. Moreover, in that state, the switch 65 is actuated to allow operation of the solenoid 70, so that depression of a brake pedal, not shown, causes excitation of the solenoid 70 to draw the plunger 70, which moves the lock arm 72 to put the detent plate 10 in the rotatable state.

A check plate 80 is secured to the position plate 9, and has a corrugated check groove 81 on the outer peripheral face formed along a circle about the shift lever 6 which is a center of rotation of the position plate 4. A plate spring 90 has one end fixed to the lower bracket 4, and another end formed with an U-shaped engagement 91. The U-shaped engagement 91 engages with the check groove 81 to provide a restrained feeling during shift operation of the shift lever 6.

Figure 3A:
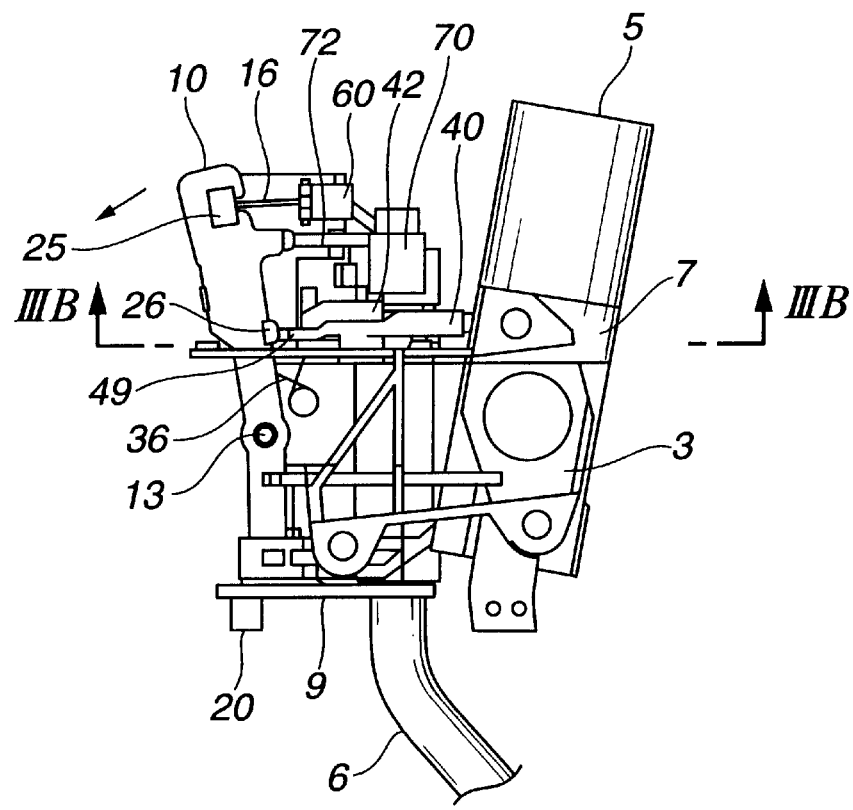
FIG. 3A is a plan view showing the column shift device in the shift lock state.
Figure 3B:
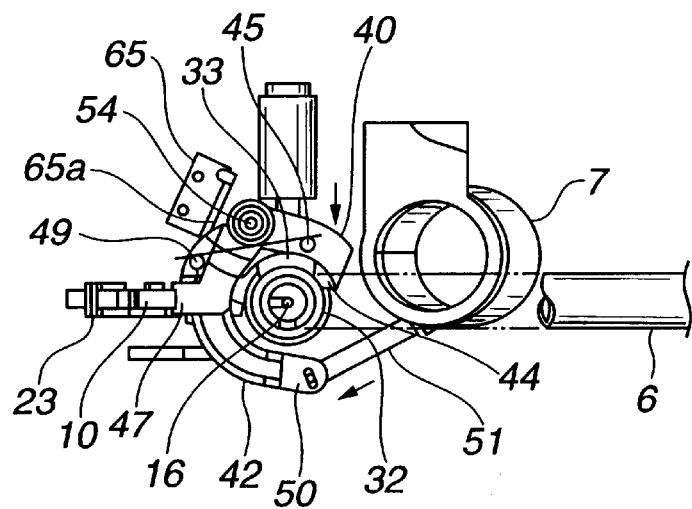
FIG. 3B is a sectional view take along the line IIIB—IIIB in FIG. 3A.

A description will be made with regard to key interlock action of the column shift device 1 having the above configuration. Referring to FIGS. 3A–3B, when the shift lever 6 is in P range, the detent plate 10 is engaged with the detent portion 21 by a biasing force of the spring 36 to prevent rotation of the shift lever 6, and the support lever 40 engages with the cam portion 33 to rotate with the key lock lever 42. Thus, the contact 47 of the support lever 40 is rotated to the position where it can abut on the bend 26 so as to allow disengagement of the lock pin 51 from the key cylinder 5, enabling rotation of the key to the lock position for its removal from the key cylinder 5. With the key removed from the key cylinder, energization of the solenoid 70 is cut off, so that shift lock cannot be released even if the brake pedal is depressed. Moreover, rotation of the key lock lever 42 is prevented, since the lock pin 51 cannot move to the key cylinder. When the key is inserted into the key cylinder, and is rotated to the ON position for depression of the brake pedal, the solenoid 70 is excited to move the lock arm 72, allowing rotation of the detent plate 10.

Figure 4A:
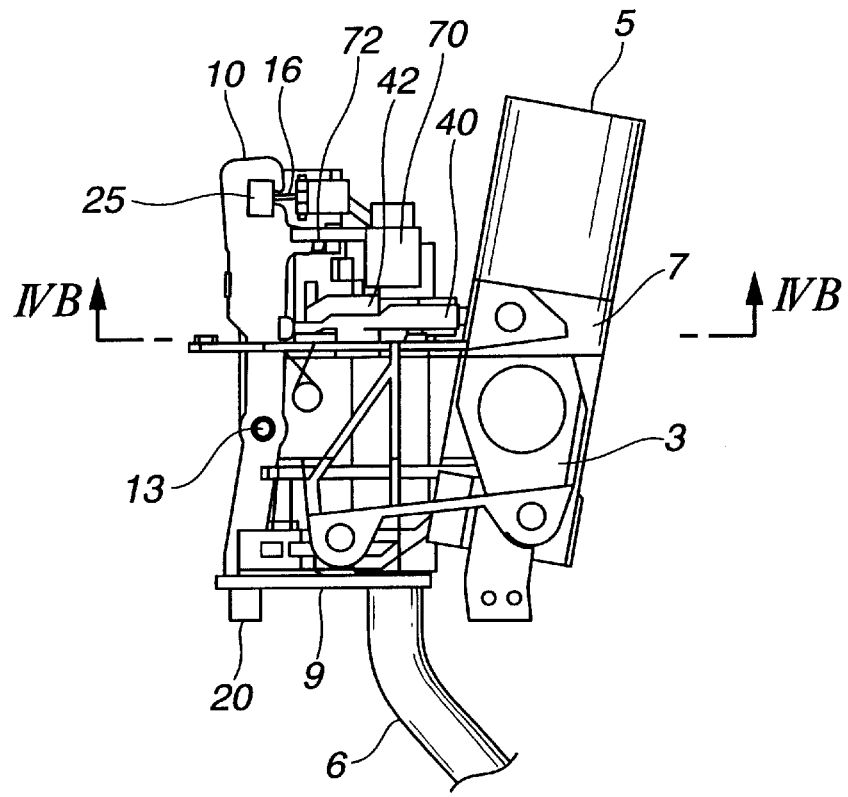
FIG. 4A is a view similar to FIG. 3A, showing the column shift device in the shift lock release state.
Figure 4B:
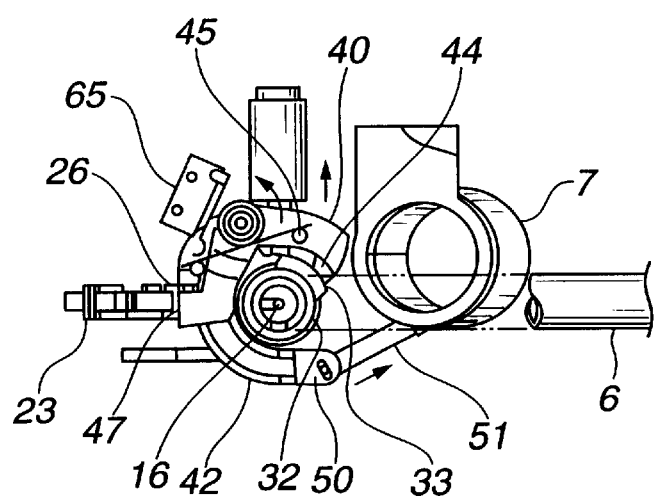
FIG. 4B is a sectional view take along the line IVB—IVB in FIG. 4A.

Referring to FIGS. 4A–4B, when the select button 18 is pushed in the knob 15 in P range, the wire 16 is drawn to the knob 15, so that the detent plate 10 is rotated to disengage from the detent portion, enabling shift operation. And the support lever 40 is pushed by the detent plate 10 for rotation, having one end mounting on the cam portion 33 of the cam 32. Moreover, the key lock lever 42 coupled with the support lever 40 by the spring 43 rotates to fit the lock pin 51 into the key cylinder 5, so that the key cannot rotate to the lock position, obtaining impossible removal of the key from the key cylinder 5.

In any of the ranges other than P range, the protrusion 44 of the support lever 40 mounts on the cam portion 33, so that the key lever 42 is in the state that the lock pin 51 engages therewith, thus maintaining impossible removal of the key from the key cylinder 5.

Moreover, in any of the ranges other than P range, the head of the plunger 71 of the solenoid 70 abuts on the cam portion 33 to prevent protrusion of the plunger 71, so that the lock arm 72 is maintained in the position where it fails to abut on the detent plate 10, thus allowing operation of the detent plate 10 through the select button 18.

The column shift device 1 includes a forced release mechanism for enabling shifting of the shift lever from P range even if the key is not inserted into the key cylinder 5. The forced release mechanism is a mechanism for forcedly shifting the lock arm 72 from the lock position where it can abut on the detent plate 10 to the lock release position where it cannot abut on the detent plate against a biasing force of the spring 73 of the solenoid 70 by using a tool, a key or the like.

With forced release, the lock arm 72 is forcedly raised upward to move to the lock release position. And since the support lever 40 and the key lock lever 42 are wholly biased by the spring 43, the detent plate 10 can be rotated by operation of the select button 18 without abutting on the lock arm 72 and in pushing the contact 47 of the support lever 40. Thus, the detent plate 10 can disengage from the detent portion 21 to shift the shift lever 6 to any of the ranges other than P range. At that time, the key lock lever 42 is in the lock position.

In the illustrative embodiment, the support lever 40 and the key lock lever 42 are different and separate components. Optionally, they may be formed integrally. In that event, the use of the spring 43 can be eliminated, and the forced release mechanism serves as a shift lock release mechanism for merely moving the lock arm 72 to the lock release position.

Further, in the illustrative embodiment, energization release is adopted wherein when the solenoid 70 is excited, the lock arm 72 is moved to the lock release position. Optionally, if the support lever 40 and the key lock lever 42 are formed integrally, energization lock may be adopted wherein when the solenoid 70 is excited, the lock arm 72 is moved to the lock position. In that case, when the shift lever 6 is in any of the ranges other than P range, it is not necessary to have the head of the plunger 71 of the solenoid 70 abutting on the cam portion 33. And excitation of the solenoid 70 is obtained when the switch 65 detects shifting of the shift lever 6 to P range, and is released when the brake pedal is depressed.

Furthermore, in the illustrative embodiment, the key interlock mechanism and the shift lock mechanism are arranged on one end face of the sleeve 8 of the bracket 4 for rotatably supporting the shift lever 6, and the position plate 9 is arranged on another end face of the sleeve. Optionally, all components may be arranged on either end face of the sleeve 8, or between two sleeves arranged in upper and lower portions.

Having described the present invention with regard to the preferred embodiment, it is noted that the present invention is not limited thereto, and various changes and modifications can be made without departing from the scope of the present invention.

The entire contents of Japanese Patent Application No. 11-296144 are incorporated hereby by reference.

What is claimed is:

1. A column shift device, comprising:

a steering column;

a bracket secured to said steering column;

a shift lever rotatably supported to said steering column through said bracket;

a position plate mounted to said shift lever, said position plate including a detent portion;

a detent plate swingably supported by said bracket, said detent plate engaging and disengaging from said detent portion of said position plate;

a wire arranged through said shift lever, said wire having one end connected to said detent plate and another end connected to a select button of said shift lever;

a cam arranged with said shift lever for unitary rotation, said cam including a cam portion;

a key cylinder arranged with said bracket;

a support lever rotatably supported by said bracket, said support lever having one end biased to engage with said cam portion of said cam and another end which can abut on said detent plate;

a key lock lever arranged rotatable with said support lever; and a lock pin connected to said key lock lever, said lock pin engaging and disengaging from said key cylinder.

2. The column shift device as claimed in claim 1, wherein said key cylinder includes a frame integrated with said bracket.

3. The column shift device as claimed in claim 1, wherein said key cylinder includes a frame secured to said bracket.

4. The column shift device as claimed in claim 1, further comprising:
- a protrusion formed on said cam;
- a switch arranged with said bracket, said switch being operable by abutting on said protrusion when said shift lever is shifted to a parking range; and
- a shift lock mechanism arranged to operate responsive to said switch, said shift lock mechanism being capable of preventing movement of said detent plate.

5. The column shift device as claimed in claim 1, wherein said support lever and said key lock lever are arranged coaxially, and are biased by a spring for unitary rotation.

6. The column shift device as claimed in claim 4, wherein said shift lock mechanism comprises a solenoid secured to said bracket and a lock arm arranged with a plunger of said solenoid to be capable of abutting on said detent plate.

7. A column shift device, comprising:
- a steering column;
- a bracket secured to said steering column;
- a shift lever rotatably supported to said steering column through said bracket;
- a position plate mounted to said shift lever, said position plate including a detent portion;
- a detent plate swingably supported by said bracket, said detent plate engaging and disengaging from said detent portion of said position plate;
- a wire arranged through said shift lever, said wire having one end connected to said detent plate and another end connected to a select button of said shift lever;
- a cam arranged with said shift lever for unitary rotation, said cam including a cam portion;
- a key cylinder arranged with said bracket;
- a support lever rotatably supported by said bracket, said support lever having one end biased to engage with said cam portion of said cam and another end which can abut on said detent plate;
- a key lock lever arranged rotatable with said support lever;
- a lock pin connected to said key lock lever, said lock pin engaging and disengaging from said key cylinder;
- a protrusion formed on said cam;
- a switch arranged with said bracket, said switch being operable by abutting on said protrusion when said shift lever is shifted to a parking range; and
- a shift lock mechanism arranged to operate responsive to said switch, said shift lock mechanism being capable of preventing movement of said detent plate.

8. The column shift device as claimed in claim 7, wherein said key cylinder includes a frame integrated with said bracket.

9. The column shift device as claimed in claim 7, wherein said key cylinder includes a frame secured to said bracket.

10. The column shift device as claimed in claim 7, wherein said support lever and said key lock lever are arranged coaxially, and are biased by a spring for unitary rotation.

11. The column shift device as claimed in claim 7, wherein said shift lock mechanism comprises a solenoid secured to said bracket and a lock arm arranged with a plunger of said solenoid to be capable of abutting on said detent plate.

* * * * *